United States Patent
Kawabata et al.

Patent Number: 5,428,340
Date of Patent: Jun. 27, 1995

[54] APPARATUS FOR MANUALLY DISABLING AND AUTOMATICALLY ENABLING AN AIR-BAG SYSTEM

[75] Inventors: Munehiro Kawabata; Hisatsugu Ito, both of Hyogo, Japan

[73] Assignee: Mitsubishi Denki Kabushiki Kaisha, Tokyo, Japan

[21] Appl. No.: 235,223

[22] Filed: Apr. 29, 1994

Related U.S. Application Data

[63] Continuation of Ser. No. 966,833, Oct. 27, 1992, abandoned.

[30] Foreign Application Priority Data

Oct. 28, 1991 [JP] Japan .................. 3-281159

[51] Int. Cl.⁶ ............................ B60Q 1/00
[52] U.S. Cl. .................. 340/438; 340/457; 280/735
[58] Field of Search ........... 340/438, 457; 280/728, 280/729, 730, 731, 732, 733, 734, 735

[56] References Cited

U.S. PATENT DOCUMENTS

| | | |
|---|---|---|
| 4,020,453 | 4/1977 | Spies et al. . |
| 4,950,914 | 8/1990 | Kurihara et al. ............ 280/735 X |
| 5,081,442 | 1/1992 | Ito et al. . |
| 5,122,780 | 6/1992 | Midorikawa et al. ............ 340/438 |
| 5,165,717 | 11/1992 | Tanaka .................. 280/734 |

FOREIGN PATENT DOCUMENTS

| | | |
|---|---|---|
| 0283188 | 11/1990 | European Pat. Off. . |
| 4113710 | 8/1992 | Germany . |

OTHER PUBLICATIONS

Japanese Printed Publication 1,317,848 in: Patents Abstracts of Japan, Sect. M, vol. 14 (1990), No. 121 (M-946).

Primary Examiner—Jeffery A. Hofsass

[57] ABSTRACT

An apparatus for detecting collision of a vehicle for an air-bag system, the apparatus comprising means for operating said air-bag system when the signal from a generating means corresponding to a shock to the vehicle exceeds a predetermined value. A switch means manually subjects said operating means to unoperated state for a predetermined period. Whereby an erroneous operation of an air bag system is prevented by the switch means even when a shock is applied to the apparatus for detecting a collision of vehicles while it is being inspected or repaired.

3 Claims, 4 Drawing Sheets

APPARATUS FOR MANUALLY DISABLING AND AUTOMATICALLY ENABLING AN AIR-BAG SYSTEM

This application is a continuation of application Ser. No. 07/966,833 filed on Oct. 27, 1992, now abandoned.

BACKGROUND OF THE INVENTION

The present invention relates to an apparatus for detecting a collision of vehicles, specifically for use in a vehicular air-bag system.

FIG. 6 is a block diagram of a conventional apparatus for detecting a collision of vehicles of the type disclosed in, for instance, Japanese Patent Laid-Open No. 241467/1988. In FIG. 6, a piezo-electric element 1 is as an acceleration sensor, and a signal processing circuit 2 is on the output side of the piezo-electric element 1. The signal processing circuit 2 comprises an impedance converter 3 connected to the output terminal 1a of the piezo-electric element 1, an integrator 4 on the output side thereof, a comparator 5 for outputting a high-level signal when the output voltage of the integrator 4 exceeds a set voltage, and a transistor 6 which is turned on at the high-level signal from the comparator 5.

The transistor 6 is provided in an ignition circuit in which a detonator 7 for operating an air bag is connected to a battery 8. When a shock exceeding a predetermined value is applied to the piezo-electric element 1 at the time of collision, the output voltage generated from the piezo-electric element 1 is applied via the impedance convertor 3, the integrator 4 and the comparator 5 to the transistor 6, which is instantly turned on and the detonator 7 is ignited thereby. A mechanical acceleration sensor 9 is provided for preventing an explosion in error, this sensor having a contact with the ignition circuit, and a fail-safe relay 10 is provided to the ignition circuit.

A diagnostic pulse generator 11 is connected to the input terminal 1b of the piezo-electric element 1 to give the counter piezo-electric effect thereof and a diagnostic circuit 12 is provided at the output of the signal processing circuit 2, that is, at the emitter of the transistor 6 to detect the on/off state of the emitter. The diagnostic circuit 12 controls the on/off state of the fail-safe relay 10 and also controls a warning lamp for example 13 provided according to needs.

For instance, on receiving a vehicle speed signal, a cranking signal and a parking brake signal, the diagnostic pulse generator 11 confirms cranking time during the stopping of a vehicle and generates a diagnostic pulse. When the diagnostic pulse is applied to the input terminal 1b of the piezo-electric element 1, output voltage due to the reverse piezo-electric effect is generated from the output terminal 1a. The period and voltage of the diagnostic pulse is set so that what is higher than the set voltage V1 of the comparator 5 is supplied from the integrator 4. Consequently, the transistor 6 is turned on when the diagnostic pulse is generated unless there is a malfunction of the piezo-electric element 1 and the signal processing circuit 2, whereby the voltage is applied from the battery 8 to the diagnostic-circuit 12. When no voltage is applied to the diagnostic circuit 12 within a predetermined lapse of time after the generation of the diagnostic pulse, the diagnostic circuit 12 decides the presence of trouble and turns the fail-safe relay 10 off and then activates an alarm 13. Since the diagnostic pulse is produced during the stopping of a vehicle, the contact of the mechanical acceleration sensor 9 remains off and the detonator 7 is prevented from ignition.

The conventional apparatus for detecting a collision of vehicles is thus constructed and it involves a risk of explosion in error in case an impulse is applied thereto by mistake in such a state that the power supply has been kept on while the apparatus is being repaired.

SUMMARY OF THE INVENTION

An object of the present invention is to eliminate the foregoing problems to provide an apparatus for detecting a collision of vehicles in such a way that when the operation of a safety device such as an air bag is unnecessary, the operation of the air bag out of a preferred period is absolutely prevented even though a shock is applied in error.

An apparatus for detecting a collision of vehicles according to the present invention is provided with means for manually subjecting an air-bag operating means to an unoperated state when the collision is detected.

An apparatus for detecting a collision of vehicles according to the present invention is provided with a warning means for warning that the means for manually stopping the operation of the drive means is in operation.

An apparatus for detecting a collision of vehicles according to the present invention is provided with means for automatically releasing the operation of the means for manually subjecting the operation means for the air-bag to the unoperated state while the vehicle is in the running condition.

According to the present invention, the means for operating the air-bag system can be subjected manually to an unoperated state, whereby the air bag is prevented from malfunctioning at the time it is repaired or inspected.

According to the present invention, moreover, a warning is output from a warning means during the operation of the means for manually subjecting the operation means for the air-bag system to the unoperated state, whereby it is prevented from being forgotten to switch off the means for manually subjecting the operation means to the unoperated state.

According to the present invention, further, the operation of the means for manually subjecting the operation means for the air-bag system is automatically released while the vehicle is in the travel condition. However, the operation of the air bag is secured as occasion demands even when it is forgotten to switch off the means for manually subjecting the operation means to unoperated state.

DETAILED DESCRIPTION OF THE PREFERRED EMBODIMENTS

Embodiment 1

Figure 1:
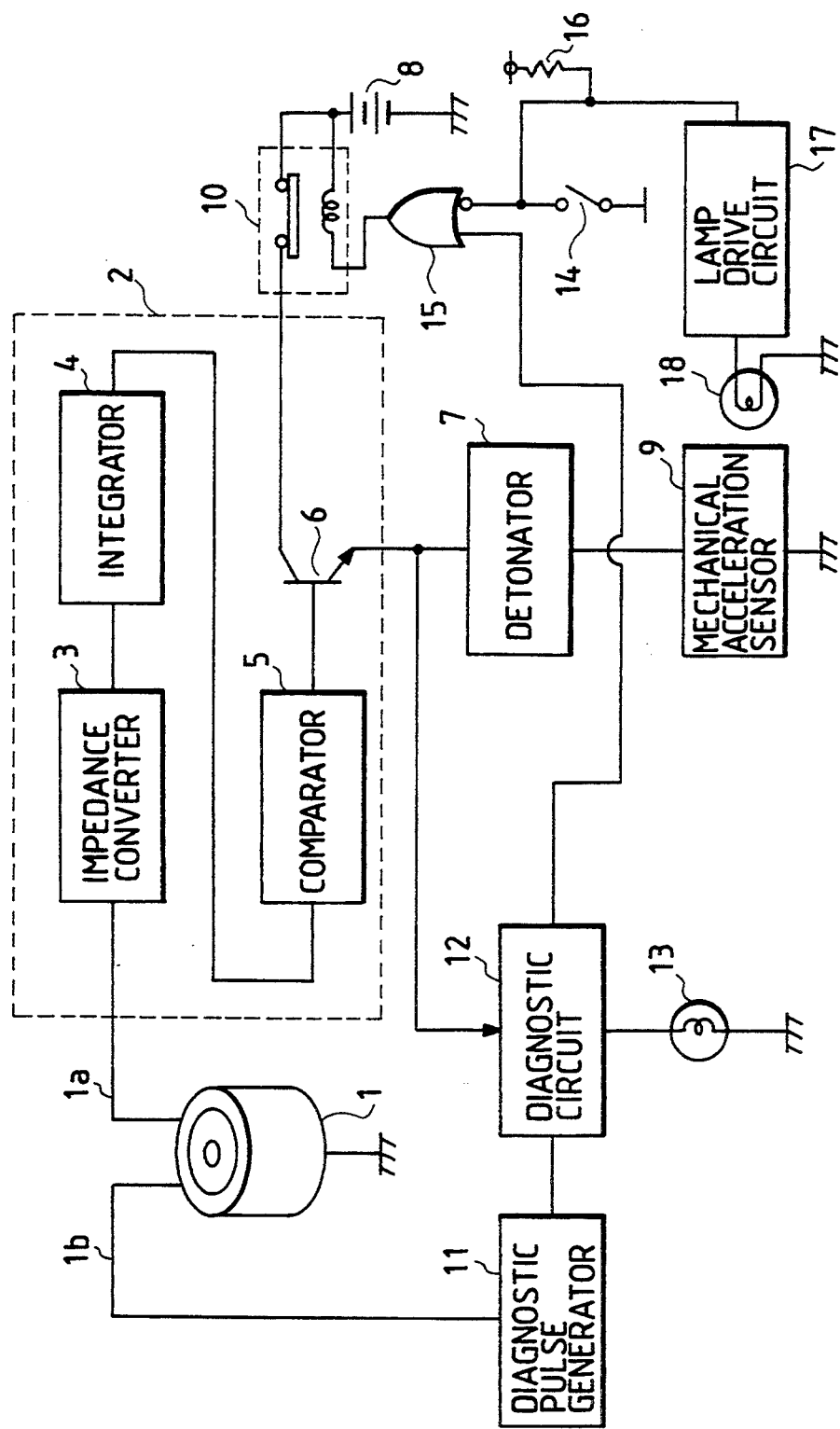
FIG. 1 is a block diagram of an apparatus for detecting a collision of vehicles in a first embodiment of the present invention.

Referring to the accompanying drawings, embodiments of the present invention will subsequently be described- FIG. 1 shows a system in a first embodiment of the present invention. In FIG. 1, a switch 14 upon manual operation subjects the system to an unoperated state, a logic circuit 15 subjects the outputs of the switch 14 and a diagnostic circuit 12 to an OR function and turns off a fail-safe relay 10 when the switch 14 is held ON or when the result of diagnosis obtained from the diagnostic circuit 12 is abnormal. A pull-up resistor 16 subjects the input level of the logic circuit 15 to a high level when the switch 14 is held OFF. A lamp drive circuit 17 turns on a lamp 18 as an alarm when the switch 14 is held ON.

Figure 2:
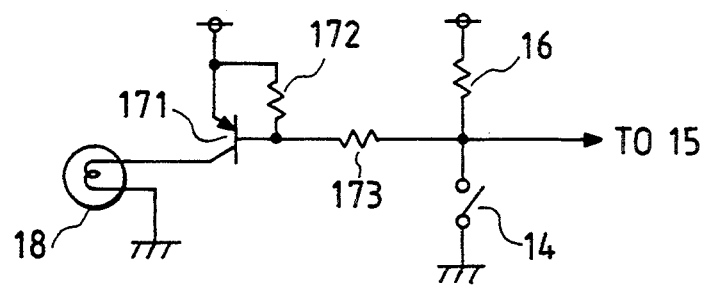
FIG. 2 is a circuit diagram of a lamp drive circuit in the first embodiment thereof.
Figure 3:
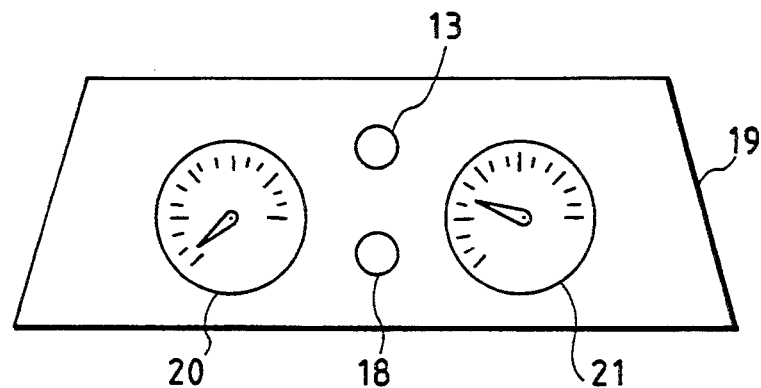
FIG. 3 is an front view of a vehicle meter in the first embodiment thereof.

FIG. 2 is a detailed block diagram of the lamp drive circuit 17, wherein a switching transistor 171 turns on/off current to be supplied to the lamp 18; resistors 172 and 173 control the transistor 171. FIG. 3 is a diagram illustrating a vehicular meter 19 with a speed meter 20 and an engine revolution indicator 21.

Subsequently, the operation of the system thus configured will be described. The operation of the parts numbered 1 to 13 are omitted as they are similar to those in the conventional system. When the switch 14 is turned OFF, the input of the logic circuit 15 on the switch side 14 is set by the pull-up resistor 16 at a high level and only the output of the diagnostic circuit 12 is applied to the output of the logic circuit 15. Consequently, the operation similar to what is in the conventional system is performed. While the switch 14 is ON, however, the output of the logic circuit 15 is caused to remain always at a high level and the fail-safe relay 10 is turned off, whereby a detonator 7 cannot be ignited even though a mechanical acceleration sensor 9 and a piezo-electric element 1 are ready to ignite it. Even though an impulse is applied by mistake to the piezoelectric element 1 and the mechanical acceleration sensor 9 while an apparatus for detecting the collision of vehicles is being repaired or inspected, an air bag is never allowed to inflate open as the current is caused to flow into the detonator as long as the switch 14 is held ON.

When the switch 14 is turned on, the lamp drive circuit operates to light the lamp and informs the driver that the air bag is not in an operative mode. While the vehicle is in the normal travel condition, the driver may arrange to inflate open the air bag at the time of collision by turning off the switch 14. In other words, the transistor 171 is held OFF when the switch 14 is held OFF and the lamp is also held OFF. However, the transistor 171 is held ON when the switch 14 is held ON, whereby the lamp 18 thus energized is caused to light up. As a result, the lamp 18 of the vehicular meter 19 shown in FIG. 3 is caused to light up and the driver is informed that a the operation of the switch 14 has been forgotten.

Embodiment 2

Figure 4:
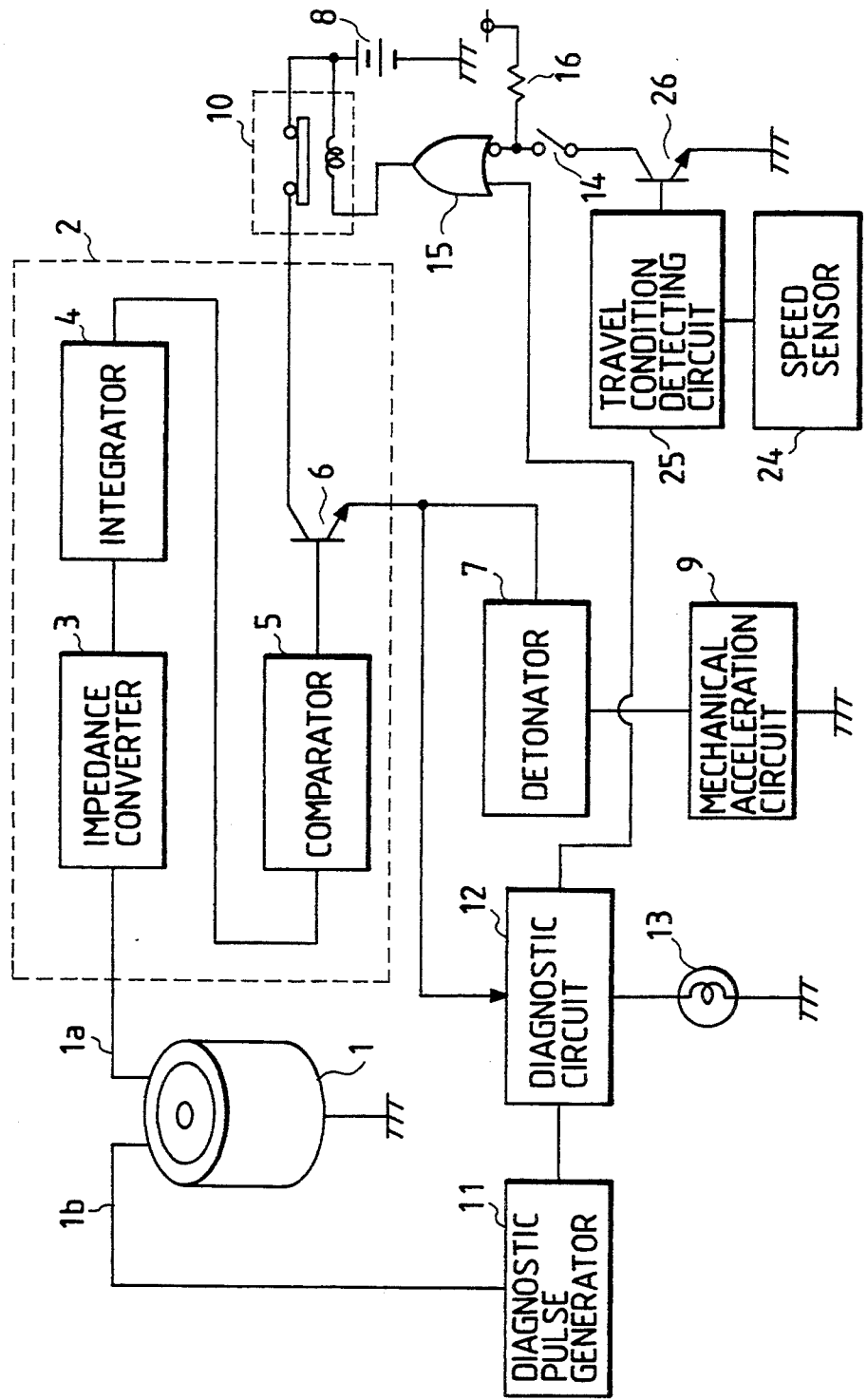
FIG. 4 is a block diagram of an apparatus therefor in a second embodiment of the present invention.
Figure 6:
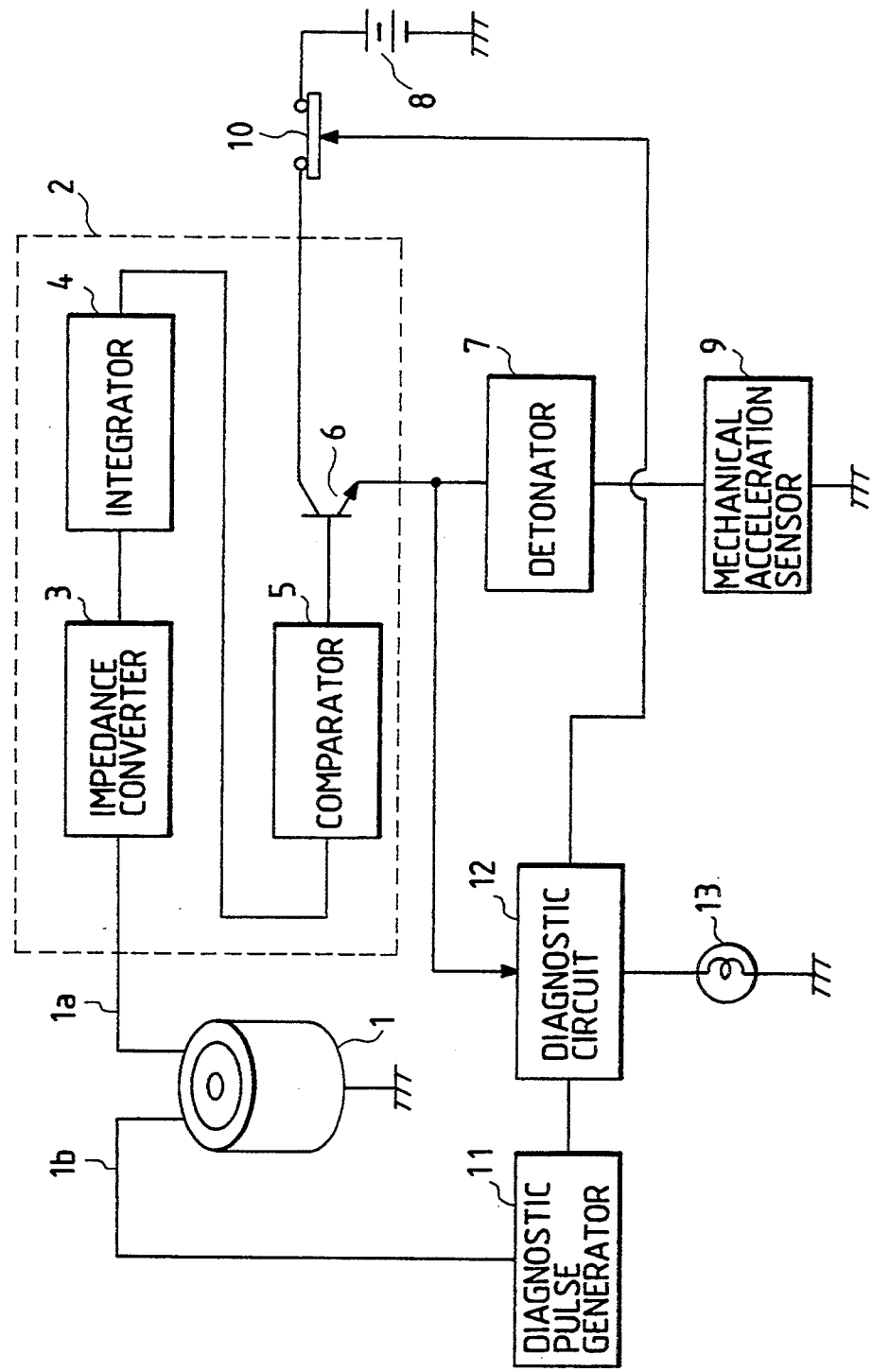
FIG. 6 is a block diagram of a conventional apparatus for detecting a collision of vehicles.

FIG. 4 shows a system configuration in a second embodiment of the present invention, wherein the parts numbered 1 to 16 are similar to those shown in the first embodiment. In FIG. 4, a speed sensor 24 a travel condition decision circuit for deciding whether or not the vehicle is in the travel condition, 26 a transistor to be driven by the travel condition decision circuit 25.

Figure 5:
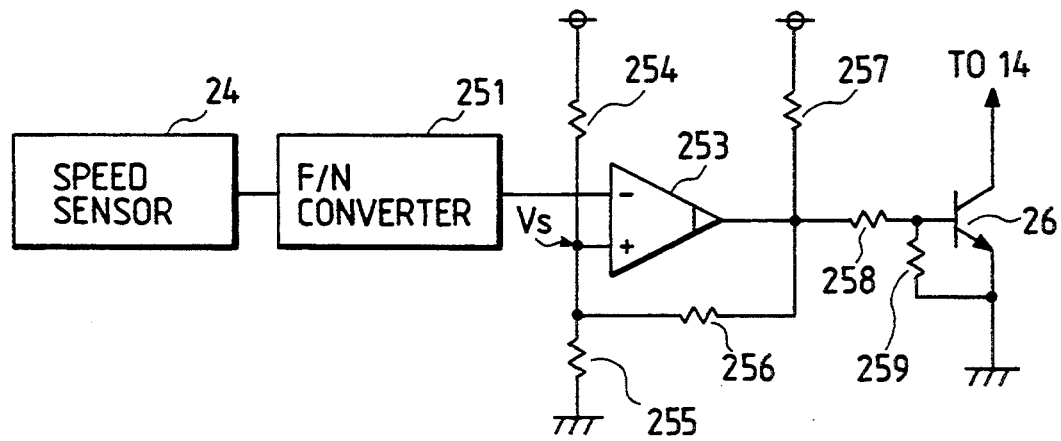
FIG. 5 is a circuit diagram of a travel condition decision circuit in the second embodiment thereof.

FIG. 5 is a circuit diagram of a travel condition decision circuit 25, wherein an F/V (frequency to voltage) convertor 251, a comparator IC 253, resistors 254 to 257 constitute a comparator, and resistors 258 and 259 for controlling the transistors 26 are provided.

Referring to FIGS. 4, 5, a description will be given of the operation. However, the operation that has already been described above will be omitted. Although the lamp 18 is lighted to inform the driver that the air bag is unoperational when it is forgotten to turn off the switch 14 in the first embodiment, the switch 14 is not turned off unless the driver notices that the lamp 18 is lighted and takes action. This means that the air bag still remains unoperational. Therefore, the pulse signal generated from the speed sensor 24 is applied to the travel condition decision circuit 25 during the travel of a vehicle in the second embodiment and when the travel condition decision circuit 25 decides that the vehicle is in the travel condition, the transistor 26 is turned off.

The input of the logic circuit 15 on the switch side is set at a high level, irrespective of the ON/OFF state of the switch 14, and its output becomes leveled with the output of the diagnostic circuit 12, so that the normal operation of the collision detector is resumed. When the travel condition decision circuit 25 otherwise decides that the vehicle is not in the travel condition, the transistor 26 is turned off and the ON/OFF state of the switch 14 is directly transmitted to the logic circuit 15. Consequently, the fail-safe relay 10 is held OFF as long as the switch 14 is held ON and the air bag is not inflated open.

Referring to FIG. 5, the operation of the travel condition decision circuit 25 will subsequently be described. The speed sensor 24 generates a pulse during the travel of a vehicle and the frequency of the pulse becomes higher as the vehicle speed increases. The pulse is therefore integrated by the F/V converter 251 before being converted into d.c. voltage, which becomes higher as the speed increases. The voltage is then compared with a reference voltage Vs in the comparators 253 to 257 and if it is higher than Vs, the transistor 26 is turned off and if lower than Vs, the transistor 26 is turned on; in other word, the transistor 26 is turned off if the vehicle speed is higher than a predetermined speed and turned on if the speed is lower than the predetermined speed. The predetermined speed is determined by the reference voltage Vs. In this way, a decision is made on whether the vehicle is in the travel condition or at a standstill.

As set forth above, the operation of the drive means for driving the means for operating the air bag can be stopped manually according to the present invention, whereby the air bag is prevented from bursting in error even though an impulse is applied by mistake to the apparatus while it is being inspected or repaired.

Moreover, it is prevented from being forgotten that the means for manually stopping the operation of the drive means ought to be turned on as warning is given of the fact that the means therefor is in operation according to the present invention to ensure that the air bag is operated at the time of collision.

Further, the operation of the means for manually stopping the operation of the drive means is automatically released when the vehicle is in the travel condition according to the present invention to ensure that the air bag is operated at the time of collision.

What is claimed is:

1. An apparatus for detecting collision of a vehicle for an air-bag system, said apparatus comprising:

means for generating a signal according to a shock to the vehicle;

means for operating said air-bag system when the signal from said generating means exceeds a predetermined value;

an electrical device means for manually operating the electrical device to subject said operating means to an unoperated state;

means for detecting the running state of the vehicle; and means for automatically releasing the operation of said means for manually operating while the vehicle is in the running condition.

2. The apparatus according to claim 1, wherein said means for releasing includes a speed sensor.

3. The apparatus according to claim 2, wherein said means for releasing includes a condition decision circuit having an input operatively connected to said speed sensor and an output operatively connected to a transistor.

* * * * *